US 6,619,034 B1

(12) United States Patent
Hilbert

(10) Patent No.: US 6,619,034 B1
(45) Date of Patent: Sep. 16, 2003

(54) METHOD AND APPARATUS FOR REDUCING VEHICULAR EMISSIONS BY SELECTIVELY HEATING A CATALYTIC CONVERTER

(75) Inventor: Harold Sean Hilbert, Canton, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 10/063,165

(22) Filed: Mar. 27, 2002

(51) Int. Cl.[7] .................................. F01N 3/00
(52) U.S. Cl. ..................... 60/284; 60/274; 60/285; 60/286; 180/65.2; 180/65.3
(58) Field of Search .................. 60/284, 274, 286, 60/300, 303, 285; 180/65.2, 65.3, 65.4

(56) References Cited

U.S. PATENT DOCUMENTS

| 5,163,290 A | | 11/1992 | Kinnear et al. |
| 5,191,763 A | | 3/1993 | Yuuki et al. |
| 5,233,831 A | * | 8/1993 | Hitomi et al. ............... 60/284 |
| 5,323,868 A | * | 6/1994 | Kawashima ............... 180/65.4 |
| 5,785,137 A | | 7/1998 | Reuyl et al. |
| 5,785,138 A | * | 7/1998 | Yoshida ..................... 180/65.2 |
| 5,950,419 A | | 9/1999 | Nishimura et al. |
| 6,052,988 A | * | 4/2000 | Ikeda ......................... 60/284 |
| 6,122,910 A | * | 9/2000 | Hoshi et al. ................ 60/297 |
| 6,151,890 A | * | 11/2000 | Hoshi ......................... 60/297 |
| 6,195,985 B1 | | 3/2001 | del Re |

* cited by examiner

Primary Examiner—Thomas Denion
Assistant Examiner—Binh Tran
(74) Attorney, Agent, or Firm—Dykema Gossett; Carlos L. Hanze

(57) ABSTRACT

A method and an apparatus 10 for reducing the amount of vehicular emissions during and shortly after a vehicle 12 has been started. The assembly includes at least one heater 80, 82 which is coupled to a catalytic converter assembly 22 and which heats the catalytic assembly 22 during and/or for a period occurring shortly after the vehicle 12 has been started. The assembly 10 also includes a load, such as motor/generator 16, which is selectively applied to the internal combustion engine of the vehicle 12 during and/or for a period occurring shortly after the vehicle 12 has been started in order to increase the temperature and the amount of exhaust gasses which are communicated to the catalytic converter assembly 22 from the internal combustion engine 14.

8 Claims, 1 Drawing Sheet

METHOD AND APPARATUS FOR REDUCING VEHICULAR EMISSIONS BY SELECTIVELY HEATING A CATALYTIC CONVERTER

BACKGROUND OF INVENTION

1. Field of the Invention

The present invention generally relates to a method and an apparatus for reducing vehicular emissions and to a vehicle which incorporates the method and apparatus and more particularly, to a method and an apparatus for reducing such emissions when the vehicle is started.

2. Background of the Invention

A vehicle, such as and without limitation a hybrid electric vehicle, typically includes an internal combustion engine which may be selectively started or activated and, once started or activated, produces torque from the selective combustion of a mixture of gas and air. Such combustion causes certain material to be produced which emanates from and which is exhausted from the engine. The vehicle further, according to one emission control strategy, typically includes a catalytic converter assembly which receives the exhausted material and which processes or converts much, but not all, of such produced material into a desired material and which emits the processed material from the vehicle. Hence, relatively small amounts of the material which is originally exhausted from the engine may be actually emitted into the atmosphere by the vehicle, such undesirable material typically being referred to as vehicular emissions.

Typically, the catalytic converter assembly must reside at or above a certain minimum threshold temperature in order to process the received material in a desired manner. When the vehicle is initially started, the temperature of the catalytic converter assembly may be relatively cool (e.g., especially during a cold start, such as when the vehicle has been parked for a relatively long time in a relatively cold ambient environment), thereby causing a relatively large amount of the engine exhaust material to be emitted from the catalytic converter assembly and from the vehicle and causing the amount of such vehicular emissions to be undesirably large. The present invention addresses this drawback and reduces such vehicular emissions when the vehicle is started, especially during a cold start condition or operation.

SUMMARY OF INVENTION

An assembly and apparatus are provided for reducing the amount of undesirable emissions which emanate from the vehicle and which overcomes some or all of the previously delineated drawbacks of current emission control strategies.

In particular, the invention is particularly advantages as the vehicle is being started and as the engine is being operated for a predetermined amount of time after the vehicle is started.

In accordance with the present invention, an assembly is provided for increasing the temperature of a catalytic converter assembly. The assembly includes at least one heater, which is coupled to the catalytic converter assembly and a controller which is coupled to the at least one heater which detects the movement of an ignition switch to an activated position and, based upon the detected position of the ignition switch, activates the at least one heater, thereby heating the catalytic converter assembly when the ignition switch is moved to the activated position.

In accordance with another aspect of the present invention, a vehicle having a catalytic converter assembly, an engine which is coupled to the catalytic converter assembly, an ignition switch which may be selectively moved to a certain position which causes the engine to be started, a selectively energizable heater which is coupled to the catalytic converter assembly, a battery, and a controller which is coupled to the battery, to the ignition switch, and to the selectively energizable heater, the controller detecting the movement of the ignition switch to the certain position and, in response to the detected movement, causes energy to be communicated from the battery to the heater, thereby selectively energizing the heater and causing the catalytic converter assembly to be heated.

In accordance with another aspect of the present invention, a method is provided for reducing emissions from a vehicle of the type having a selectively activatable engine and a catalytic converter which is coupled to the engine. Particularly, the method includes the steps of sensing the activation of the engine; and heating the catalytic converter assembly upon the sensed activation of the engine.

These and other features and advantages of the invention will become apparent from a reading of the following detailed description of the preferred embodiment of the invention and by reference to the following drawings.

DETAILED DESCRIPTION

Figure 1:
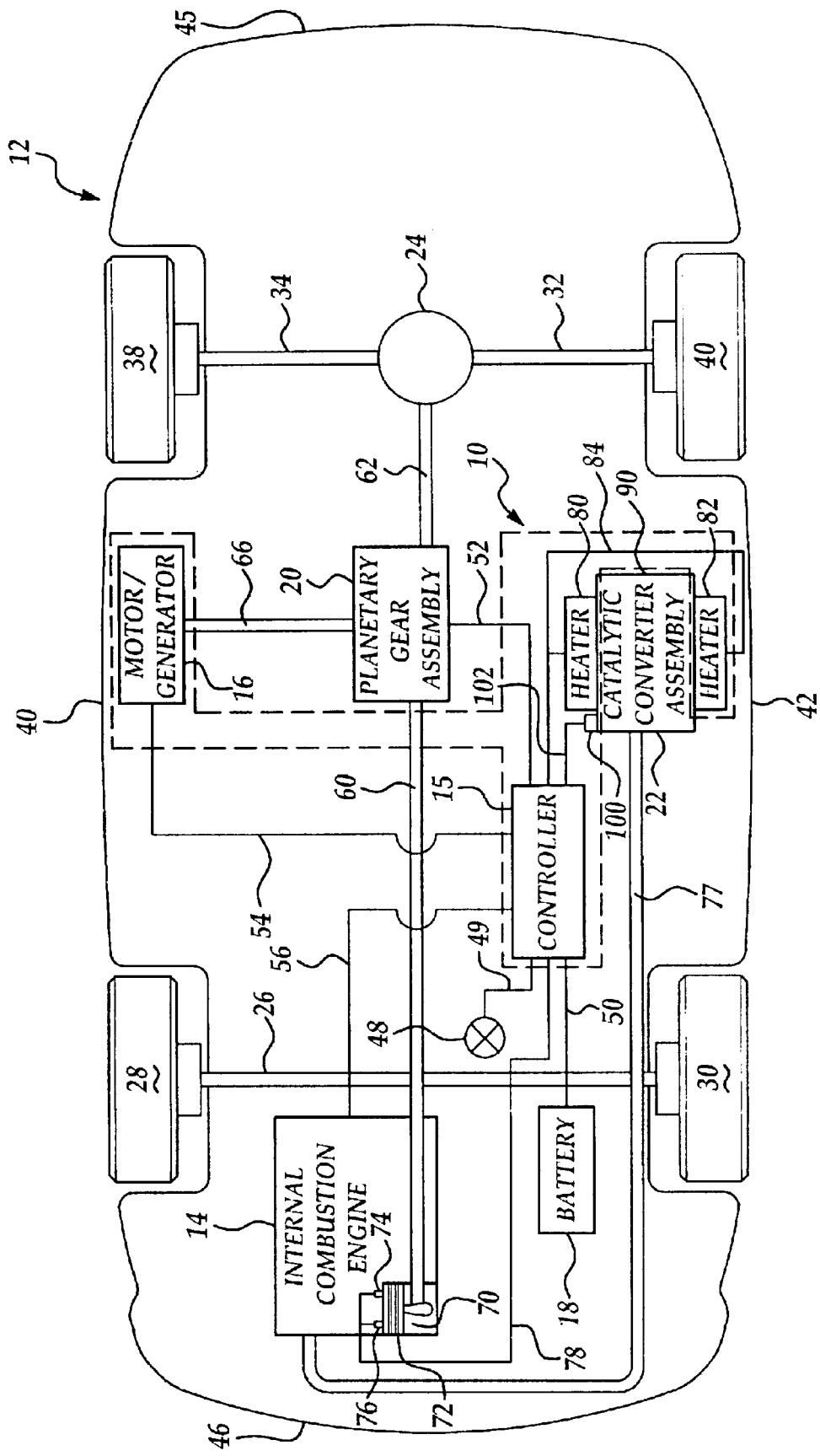
FIG. 1 is a block diagram of an apparatus which is made in accordance with the teachings of the preferred embodiment of the invention and operatively deployed within a hybrid electric vehicle.

Referring now to FIG. 1, there is shown a vehicular emission reduction assembly 10 which is made in accordance with the teachings of the preferred embodiment of the invention and which is operatively deployed within a vehicle 12.

Particularly, the vehicle 12 comprises a hybrid electric vehicle of the type having an internal combustion engine 14, a controller 15 which operates under stored program control, a motor/generator 16, a battery 18, a planetary gear assembly 20, a catalytic converter assembly 22 having at least one catalytic converter 90, and a differential assembly 24. As discussed below, controller 15 and motor/generator 16 may also be included within assembly 10. Moreover, the vehicle 12 includes a front axle 26 and a first pair of wheels 28, 30 which are coupled to opposite ends of the front axle 26, a pair of rear axle half-shafts 32, 34 which are coupled to the differential assembly 24, and a second pair of wheels 38, 40 which are respectively coupled to the axles or half shafts 32, 34. The vehicle 12 further includes a first frame member 40 which receives axles 26 and 34 and a second frame member 42 which receives axles 26 and 32. The frame members 40, 42 are coupled by frame members 45, 46. The vehicle 12 further includes a selectively movable ignition switch 48 which is coupled to the controller 15 by the use of bus 49.

As shown, the battery 18 is coupled to the controller 15 by bus 50 and the controller 15 is coupled to the planetary gear assembly 20 by bus 52 and to the motor/generator by bus 54. The internal combustion engine 14 includes a crankshaft 60 which is coupled to the planetary gear assembly 20 and the planetary gear assembly 20 includes an output shaft 62 which is coupled to the differential assembly 24. The motor/generator 16 further includes an output shaft 66 which is coupled to the planetary gear assembly 20.

Further, as shown, the internal combustion engine 14 conventionally includes several cylinders, such as cylinder 70, which contains a movable piston 72 which is coupled to the crankshaft 60. Each cylinder, such as cylinder 70, includes a fuel injector 74 and a spark plug 76. The fuel injectors 74 and the spark plugs 76 are controllably coupled to the controller 15 by the use of bus 78. Particularly, the fuel injectors 74 are communicatively coupled to a source of fuel (not shown) and each injector 74 injects or places a certain amount of fuel into the respective cylinder which it resides. Each spark plug 76 becomes selectively energized to selectively combust the mixture of air and fuel which resides within the cylinder that the spark plugs 76 respective reside within, thereby cooperatively causing the crankshaft 60 to rotate and to produce torque. The internal combustion engine 14 also includes an exhaust manifold assembly 77 which is coupled to the cylinders, such as cylinder 70, and which communicates the material emanating from the cylinders to the catalytic converter assembly 22.

In conventional vehicular operation, the controller 15 senses the desired activation or starting of the vehicle 12 by the turning of the ignition switch 48 to an on or activated position. The controller 15 then causes either the internal combustion engine 14 to become activated by causing air and fuel to be combusted within the cylinders 70 and/or causes electrical energy to be sourced from the battery 18 to the motor/generator 16, effective to cause the shaft 66 to rotate. The controller 15 further, by the use of bus 52, causes the gear assembly 20 to couple the torque produced by the crankshaft 60 and/or the output shaft 66 to be coupled to the shaft 62. The torque is then communicated to the differential assembly 24, by the shaft 62, and this communicated torque is then transferred to the axles 32, 34, effective to cause the wheels 38, 40 to rotate and to allow the vehicle 12 to be propelled.

It should be appreciated that only the relevant portions of the vehicle 12 are shown and it should be further appreciated that only a single type of hybrid electric vehicle is shown within FIG. 1 and that nothing in this description is meant to limit the use or the applicability of the present invention to this type of hybrid electric vehicle. Moreover, it should be appreciated that the invention may also be applicable, as will be apparent from the following discussion, to conventional vehicles having only an internal combustion engine. It should also be appreciated that the controller 15 may comprise several controllers which cooperatively provided the functionality which has been described above and which is set forth below with respect to controller 15, and that the planetary gear assembly 20 may also comprise several gear assemblies which cooperatively provide the functionality which has been set forth above and which is set forth below with respect to the planetary gear assembly 20.

Assembly 10 includes a pair of electric heaters 80, 82 (a single such heater may be used in an alternative embodiment) which are physically mounted or coupled to the catalytic converter assembly 22 and a controller, such as controller 15, which is controllably coupled to the heaters 80, 82 by the use of bus 84. Assembly 10 further includes a load which is selectively attached to the crankshaft 60 and, in one nonlimiting embodiment, such a load may comprise the motor/generator 16. Assembly 10 may also include a temperature sensor 100 which resides within and/or upon the catalytic converter assembly 22 and which measures the temperature of the assembly 22 and communicates this information to the controller 15 by bus 102.

In operation, when the controller 15 determines that the ignition switch 48 has been selectively and turnably placed in an activated position (indicating a desired start or activation of the engine 14 and/or the vehicle 12), the controller causes electrical power to be sourced from the battery 18 to the electric heaters 80, 82 in order to allow the catalytic converter assembly 22 to be quickly heated. The controller 15 may also, or alternatively, in an alternative embodiment of the invention, allow the energy from the motor/generator 16 to be shunted directly to the heaters 80, 82, thereby bypassing the battery 18. The controller 15 may also cause the motor/generator 16 to be coupled to the crankshaft 60, by commands which are transmitted to and received by the planetary gear assembly 20, in order to increase the load applied to the internal combustion engine 14. A retardation of the timing of the firing or activation of the spark plugs 76 may also be accomplished. For example, each spark plug 76 is activated when the respective piston 72 which is disposed within the respective cylinder that each respective spark plug 76 is disposed within moves just past a top dead center position on the upstroke. Such timing retardation, either singularly or in combination with such an increased engine loading, increases the temperature of and the amount of produced material emanating from the internal combustion engine 14, thereby allowing the catalytic converter assembly 22 to be quickly heated. When the temperature of the catalytic converter assembly 22 reaches a certain desired value, the controller 15 deactivates the heaters 80, 82 and/or removes the load 16 from the internal combustion engine 14 and/or allows spark plug firing to occur in a conventional manner. Hence, it should be appreciated that vehicular emissions may be substantially reduced during a cold start of the vehicle 12 and for a certain period of time after the vehicle has been started), that the present invention may be utilized within a conventional non-hybrid type vehicle, and that the combination of the heaters 80, 82 and controller 15 and the combination of the controller 15 and the motor/generator 16 singularly and cooperatively comprise and/or form a catalytic converter heating assembly. In an alternative embodiment of the invention, the heaters 80, 82 are activated only for a predetermined period of time and/or the load 16 is placed upon the internal combustion engine 14 for only a predetermined period of time. In another alternative embodiment of the invention, the heaters 80, 82 are not activated unless the measured temperature of the catalytic converter assembly 22 is below a certain value and the load is not applied to the engine 14 until the measured temperature of the catalytic converter assembly 22 is below a certain value. In a further alternative embodiment, the catalytic converter assembly 22 is heated only until the temperature of the assembly 22 reaches a certain level and/or the load 16 is applied to the engine 14 only until the temperature of the assembly 22 reaches a certain level.

It is to be understood that the invention is not limited to the exact construction and method which has been discussed above, but that various changes and modifications may be made without departing from the spirit and the scope of the inventions as are set forth in the following claims.

What is claimed is:

1. An assembly for increasing the temperature of a catalytic converter assembly, said assembly comprising at least one heater which is coupled to said catalytic converter assembly; and a controller which is coupled to said at least one heater, which detects the movement of an ignition switch to an activated position and, based upon said detected movement of said ignition switch, activates said at least one heater, thereby heating said catalytic converter assembly when said ignition switch is moved to said activated position, with said catalytic converter assembly being operably coupled to an engine of the type which emits certain material having a certain temperature, and with said assembly further comprising a load which is coupled to said engine by said controller in response to said detected movement of said ignition switch to said activated position, thereby increasing said temperature of said emitted certain material.

2. The assembly of claim 1 wherein said catalytic converter assembly is operably coupled to an engine of the type having at least one cylinder containing a movable piston and into which a quantity of fuel and air is selectively and mixably combusted as said movable piston moves upwardly within said at least an cylinder, said controller further causing said combustion to occur only when said piston has gone past a top dead center position as said piston moves downwardly within said at least one cylinder.

3. The assembly of claim 1 further comprising a temperature sensor which is coupled to said catalytic converter assembly and to said controller.

4. The assembly of claim 3 wherein said at least one heater remains activated until said catalytic converter assembly is heated to a certain temperature.

5. The assembly of claim 1 wherein said at least one heater remains activated for only a predetermined period of time.

6. The assembly of claim 1 wherein said load is coupled to said engine for only a predetermined period of time.

7. The assembly of claim 1 wherein said load is coupled to said engine until the temperature of said catalytic converter assembly is of a certain value.

8. The assembly of claim 1 wherein said at least one heater is activated only when said temperature of said catalytic converter assembly resides below a certain value.

* * * * *